(12) United States Patent
Miyazawa et al.

(10) Patent No.: US 10,737,428 B2
(45) Date of Patent: Aug. 11, 2020

(54) FORMING MOLD AND INJECTION MOLD

(71) Applicant: Nissei ASB Machine Co., Ltd., Nagano (JP)

(72) Inventors: Yoshiki Miyazawa, Nagano (JP); Yoichi Tsuchiya, Nagano (JP)

(73) Assignee: NISSEI ASB MACHINE CO., LTD., Komoro-shi, Nagano (JP)

( * ) Notice: Subject to any disclaimer, the term of this patent is extended or adjusted under 35 U.S.C. 154(b) by 0 days.

(21) Appl. No.: 16/235,271

(22) Filed: Dec. 28, 2018

(65) Prior Publication Data

US 2019/0308362 A1 Oct. 10, 2019

Related U.S. Application Data

(63) Continuation of application No. 15/320,142, filed as application No. PCT/JP2015/067523 on Jun. 17, 2015, now Pat. No. 10,173,360.

(30) Foreign Application Priority Data

Jun. 20, 2014 (JP) ................................. 2014-127759

(51) Int. Cl.
*B29C 49/06* (2006.01)
*B29C 49/18* (2006.01)
(Continued)

(52) U.S. Cl.
CPC .............. *B29C 49/06* (2013.01); *B29B 11/12* (2013.01); *B29B 11/14* (2013.01);
(Continued)

(58) Field of Classification Search
CPC ... B29C 49/061; B29C 49/0073; B29C 49/18; B29C 49/12; B29C 2049/1233;
(Continued)

(56) References Cited

U.S. PATENT DOCUMENTS 2,469,130 A 5/1949 Rodman, Jr.
3,016,669 A 1/1962 Grosclaude
(Continued)

FOREIGN PATENT DOCUMENTS

CA 2451545 A1 1/2003
CN 102112284 A 6/2011
(Continued)

OTHER PUBLICATIONS

Search Report issued by the European Patent Office in corresponding European Application No. 15809870.7, dated Dec. 18, 2017 (9 pages).
(Continued)

*Primary Examiner* — Robert B Davis

(74) *Attorney, Agent, or Firm* — Finnegan, Henderson, Farabow, Garrett & Dunner, L.L.P.

(57) ABSTRACT

A forming mold is used when forming a preform, which has a neck portion and a barrel portion, and whose barrel portion is filled with a molding material over the entire axial direction thereof, by injection molding; forming a space part in the barrel portion of the preform to convert the preform into an intermediate molded product; and blow-molding the intermediate molded product to form a hollow container which is a final molded product. The forming mold is equipped with a boring rod which is inserted from the neck portion side into the barrel portion of the preform to form the space part of at least a predetermined depth in the barrel portion.

5 Claims, 10 Drawing Sheets

(51) Int. Cl.
*B29B 11/12* (2006.01)
*B29B 11/14* (2006.01)
*B29C 49/00* (2006.01)
*B29C 49/42* (2006.01)
*B29C 49/28* (2006.01)
B29C 49/02 (2006.01)
B29B 11/08 (2006.01)
B29K 67/00 (2006.01)
B29L 31/00 (2006.01)

(52) U.S. Cl.
CPC ........ *B29C 49/0073* (2013.01); *B29C 49/061* (2013.01); *B29C 49/18* (2013.01); *B29C 49/28* (2013.01); *B29C 49/4252* (2013.01); *B29B 11/08* (2013.01); *B29B 2911/1448* (2013.01); *B29B 2911/1464* (2013.01); *B29B 2911/14213* (2013.01); *B29B 2911/14486* (2013.01); *B29B 2911/14633* (2013.01); *B29C 49/02* (2013.01); *B29C 2791/001* (2013.01); *B29K 2067/003* (2013.01); *B29L 2031/712* (2013.01)

(58) Field of Classification Search
CPC ... B29B 2911/14213; B29B 2911/1448; B29B 2911/14633; B29B 2911/1464; B29B 2911/14486
USPC .......................................... 264/530; 425/530
See application file for complete search history.

(56) References Cited

U.S. PATENT DOCUMENTS

| | | | |
|---|---|---|---|
| 3,966,378 | A | 6/1976 | Valyi |
| 4,063,867 | A | 12/1977 | Janniere |
| 4,726,756 | A | 2/1988 | Aoki |
| 5,232,108 | A | 8/1993 | Nakamura |
| 5,248,533 | A | 9/1993 | Sugiura |
| 5,529,195 | A | 6/1996 | Valyi |
| 6,428,735 | B1 | 8/2002 | Deemer |
| 7,157,040 | B2 | 1/2007 | Yates, III |
| 2010/0209634 | A1 | 8/2010 | Kim et al. |
| 2012/0164258 | A1 | 6/2012 | Dordoni |
| 2013/0106027 | A1* | 5/2013 | Maki .................. B29D 22/003 264/524 |
| 2013/0196020 | A1 | 8/2013 | Nakahara |
| 2014/0131920 | A1 | 5/2014 | Nakahara |
| 2014/0302268 | A1 | 10/2014 | Ogata |
| 2016/0271330 | A1 | 9/2016 | Rhinehart et al. |

FOREIGN PATENT DOCUMENTS

| | | |
|---|---|---|
| CN | 103223709 A | 7/2013 |
| CN | 103354780 A | 10/2013 |
| DE | 10 2012 004613 A1 | 7/2013 |
| EP | 2 161 116 A1 | 4/2003 |
| JP | 4-69226 | 3/1992 |
| JP | 4-126206 | 4/1992 |
| JP | 4-131221 | 5/1992 |
| JP | 2002-137282 A | 5/2002 |
| JP | 2004-1314 | 1/2004 |
| JP | 4051231 | 2/2008 |
| JP | 2013-154622 A | 8/2013 |
| JP | 2017-501046 A | 1/2017 |
| WO | WO 2007/010286 A2 | 1/2007 |
| WO | WO 2013/012067 | 1/2013 |
| WO | WO 2015/066506 A2 | 5/2015 |

OTHER PUBLICATIONS

Database WPI XP-002776224 (2 pages), 1992.
Notification of Reasons for Refusal issued by the Japan Patent Office in corresponding Japan Application No. 2016-529418, dated Oct. 17, 2017 (7 pages).
International Search Report issued by the Japan Patent Office in International Application No. PCT/JP2015/067523, dated Aug. 4, 2015.
Notification of Reasons for Refusal issued by Japanese Patent Office in counterpart Japanese Patent Application No. 2018-021506, dated Jul. 23, 2019.
Office Action and search report issued by the China National Intellectual Property Administration in the counterpart Chinese Patent Application No. 201811359883.X dated Jun. 3, 2020.

* cited by examiner

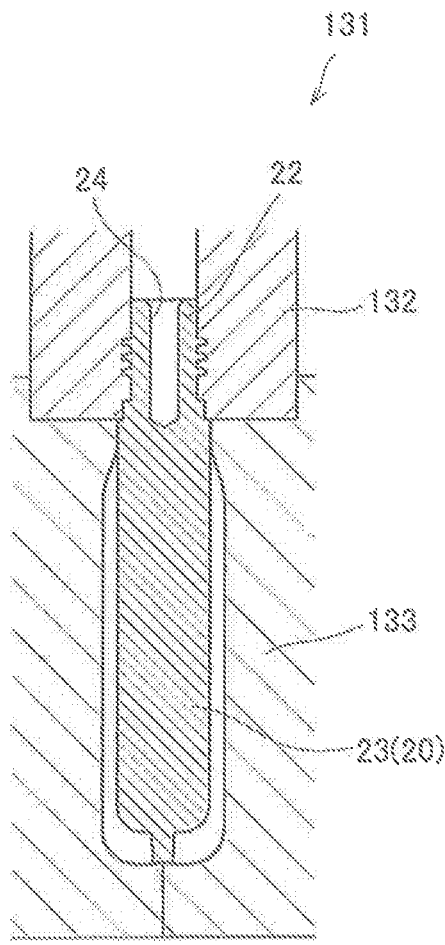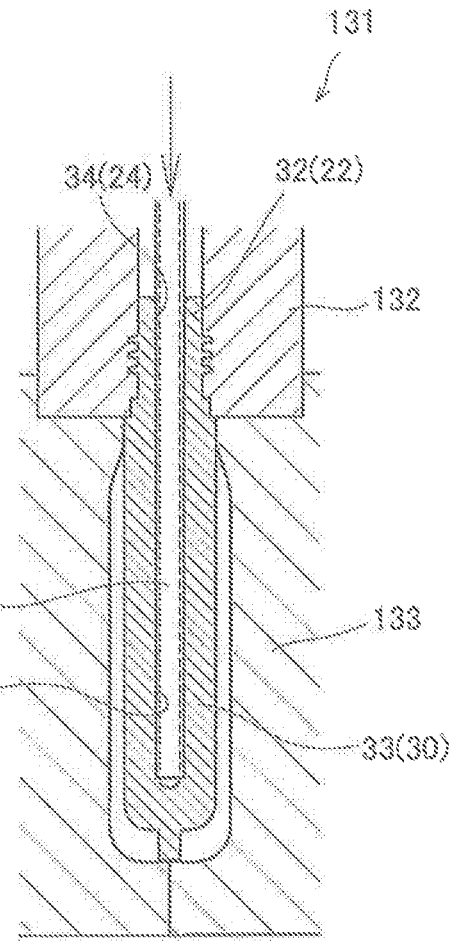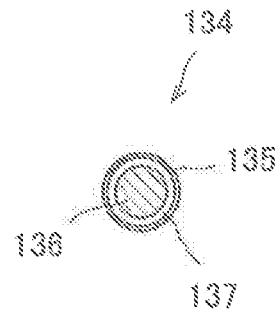
FIG. 6A  FIG. 6B
FIG. 6C

FORMING MOLD AND INJECTION MOLD

This application is a Divisional of U.S. application Ser. No. 15/320,142, filed Dec. 19, 2016, which is a 371 of International Application No. PCT/JP2015/067523, filed Jun. 17, 2015, the content of which is incorporated herein by reference.

TECHNICAL FIELD

This invention relates to a forming mold and an injection mold for use in manufacturing a hollow container.

BACKGROUND ART

Narrow-mouthed hollow containers are utilized, for example, for the storage of high grade articles expensive and sold in small quantities, such as perfumes, medicines and pills, or for the mailing of samples of toilet lotions or milky lotions. Known methods for manufacturing such hollow containers include those which use blow molding methods such as direct blow molding using a circular tube-shaped parison; injection blow molding which comprises injection molding a bottomed tube-shaped preform, followed by blowing; and injection stretch blow molding (see, for example, Patent Documents 1 and 2).

PRIOR ART DOCUMENTS

Patent Documents

Patent Document 1: JP-A-2004-1314
Patent Document 2: Japanese Patent No. 4051231

SUMMARY OF THE INVENTION

Problems to be Solved by the Invention

When a hollow container is to be manufactured by direct blow molding, the problem arises that sealing failure (such as pinholes or defective welding) is apt to occur at the bottom of the hollow container. Also, the parison involves the problem that the dimensional accuracy of its threaded part and the smoothness of the top surface of the mouth are generally poor. Thus, injection blow molding or injection stretch blow molding is more suitable than direct blow molding as a molding method for a hollow container of which a high dimensional accuracy and an aesthetic appearance are required.

With injection blow molding or injection stretch blow molding, however, there is the problem that a narrow-mouthed hollow container cannot be molded. The minimum mouth diameter of a hollow container moldable by injection blow molding or injection stretch blow molding is determined by the minimum diameter of a core mold for injection molding a preform. Since a cooling circuit or the like needs to be provided inside the core mold, the diameter of the core mold should be of a certain dimension. Thus, the minimum opening diameter of the preform cannot be rendered adequately small and, in accordance with this situation, the minimum mouth diameter of the hollow container cannot be rendered sufficiently small. Concretely, the minimum mouth diameter of the hollow container is of the order of 4.0 mm at the smallest, and a hollow container of a mouth diameter smaller than it has been difficult to mold.

The present invention has been accomplished in the light of the foregoing circumstances. It is an object of the invention to provide a forming mold and an injection mold which are capable of satisfactorily molding even a narrow-mouthed hollow container.

Means for Solving the Problems

An aspect of the present invention, aimed at solving the above problems, is a forming mold for use in forming a preform, which has a neck portion and a barrel portion, and whose barrel portion is filled with a molding material over an entire axial direction thereof, by injection molding; forming a space part in the barrel portion of the preform to convert the preform into an intermediate molded product; and blow-molding the intermediate molded product to form a hollow container which is a final molded product, wherein the forming mold is equipped with a boring rod which is inserted from a side of the neck portion into the barrel portion of the preform to form the space part of at least a predetermined depth in the barrel portion.

It is preferred that that the boring rod be configured to be capable of jetting air from at least a leading end thereof into the barrel portion of the preform.

It is preferred for the boring rod to have at the leading end thereof a ring-shaped opening for jetting air.

Another aspect of the present invention is an injection mold for use in forming a preform, which has a neck portion and a barrel portion, whose barrel portion is filled with a molding material over an entire axial direction thereof, and whose neck portion has a reference hole, by injection molding; inserting a boring rod from the reference hole to form a space part in the barrel portion of the preform, thereby converting the preform into an intermediate molded product; and blow-molding the intermediate molded product to form a hollow container which is a final molded product, wherein the injection mold is equipped with a neck mold for defining the outer peripheral surface of the neck portion, and an injection core mold disposed inside the neck mold for defining the inner peripheral surface of the neck portion.

Preferably, the injection core mold is formed in a length sufficient to reach the barrel portion.

Effects of the Invention

With the present invention as described above, there is no need to provide a cooling circuit within the core mold for injection molding the preform. Thus, the diameter of the core mold can be decreased in comparison with conventional technologies. Hence, the minimum diameter of the preform can be rendered small, and the minimum mouth diameter of the hollow container can be made small. That is, the present invention permits satisfactory molding of not only a hollow container with a relatively large mouth diameter, but also a narrow-mouthed hollow container having a very small mouth diameter.

BRIEF DESCRIPTION OF THE DRAWINGS

FIG. 6A is the first schematic sectional view illustrating an intermediate product formation step in the embodiment.

FIG. 6B is the second schematic sectional view illustrating an intermediate product formation step in the embodiment.

FIG. 6C is the third schematic sectional view illustrating an intermediate product formation step in the embodiment.

MODE FOR CARRYING OUT THE INVENTION

An embodiment of the present invention will now be described in detail by reference to the accompanying drawings.

Figure 1:
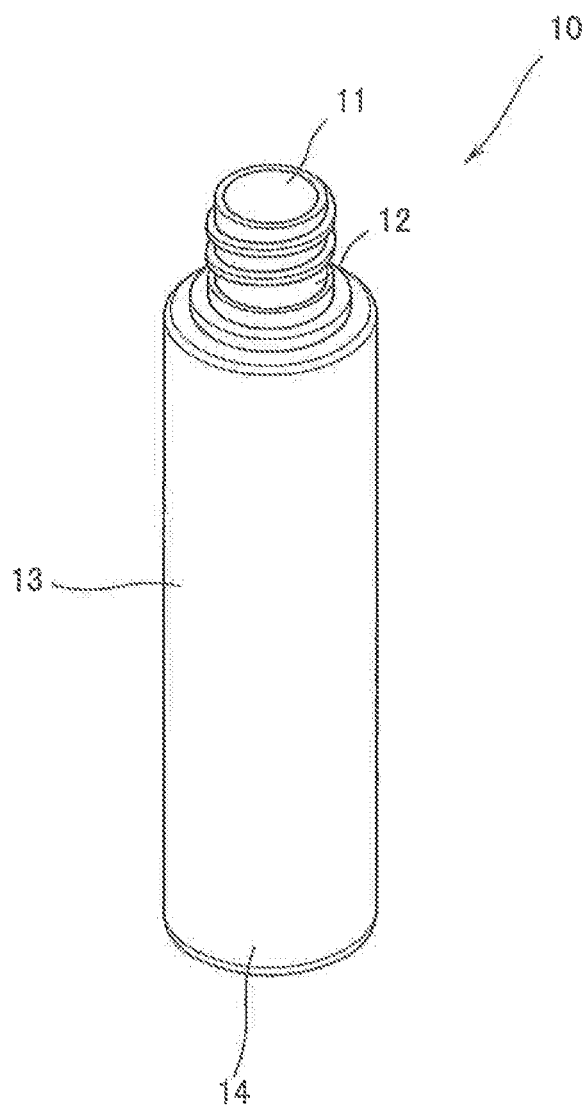
FIG. 1 is a perspective view showing an example of a hollow container.
Figure 2:
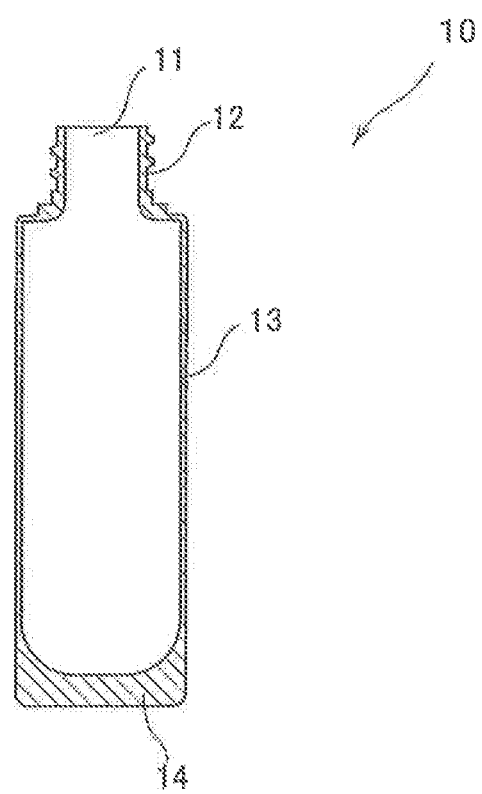
FIG. 2 is a sectional view of the example of the hollow container.

FIG. 1 is a perspective view showing an example of a hollow container, and FIG. 2 is a sectional view thereof.

A hollow container 10 shown in FIG. 1 and FIG. 2 is composed of a neck 12 having a mouth at the upper end, a tubular barrel 13 continuous with the neck 12, and a bottom continuous with the barrel 13. The hollow container 10 is a small container, for example, used as a sample storing a toilet lotion or a milky lotion, and the mouth 11 is formed with a very small opening diameter, for example, of the order of 2 to 3 mm. In the present embodiment, the bottom 14 of the hollow container 10 is formed with a larger wall thickness than that of the barrel 13. That is, the wall thickness of the barrel 13 is formed to be small as compared with the bottom 14. The material for the hollow container 10 is not particularly limited, but polyethylene terephthalate (PET), for example, is used preferably.

By shaping the hollow container 10 as above, it can be made to fit, for example, an image which consumers have of a cosmetics container. That is, such a shape can improve the aesthetic appearance of the hollow container 10, so that the hollow container 10 can be used as a cosmetics container or the like for which a good look is important.

The hollow container 10 with the mouth 11 of a very small diameter can be manufactured by a hollow container manufacturing method according to the present invention which will be described below.

Figure 3:
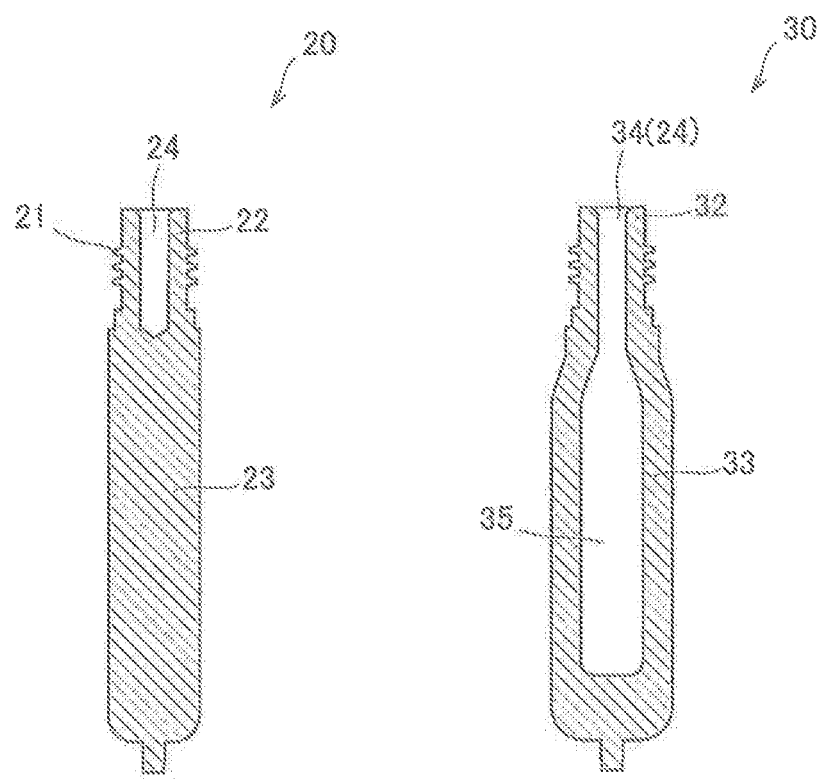
FIG. 3A is the first sectional view of an injection molded preform.
FIG. 3B is the second sectional view of an injection molded preform.

As shown in FIGS. 3A, 3B, the hollow container manufacturing method according to the present invention molds the hollow container 10 (see FIG. 2), which is a final molded product, by way of a preform 20 and an intermediate molded product 30 having predetermined shapes.

The preform 20 according to the present embodiment, as shown in FIG. 3A, has a neck portion 22 formed with a threaded groove 21 on the outer periphery, and a barrel portion 23 continuous with the neck portion 22. The neck portion 22 of the preform 20 is provided with a reference hole 24 of a predetermined depth opening to the upper end (top surface). In the present embodiment, the reference hole 24 is formed to such a depth as to reach the barrel portion 23 through the neck portion 22. The barrel portion 23 of the preform 20 is solid almost entirely. In other words, the barrel portion 23 of the preform 20 is filled with a molding material entirely in its axial direction, and is formed in a substantially cylindrical shape, rather than in a tubular shape having a space inside.

A preform for forming a hollow container, generally, refers to one formed by injection molding and having a neck portion and a bottomed tube-shape barrel portion. The preform 20 according to the present invention, on the other hand, refers to one formed by injection molding and having the neck portion 22 and the substantially solid barrel portion 23, as mentioned above. Hence, the preform according to the present invention includes, for example, one which is formed by injection molding and composed of a solid barrel portion and a solid neck portion where no reference hole is formed.

The intermediate molded product 30 has a neck portion 32 of the same shape as that of the neck portion 22 of the preform 20, and a barrel portion 33 continuous with the neck portion 32, as shown in FIG. 3B. In the neck portion 32 of the intermediate molded product 30, a mouth portion 34 constituted by the reference hole 24 and opening to the upper end is formed. The barrel portion 33 of the intermediate molded product 30 is furnished with a space part 35 formed by inserting a boring rod (to be described later) through the reference hole 24 into the barrel portion 33. That is, the intermediate molded product 30 according to the present invention refers to one provided with the space part 35 formed by inserting the boring rod into the barrel portion 33. The space part 35 refers to one formed by at least the insertion of the boring rod, and includes, for example, one formed by blow molding as well as the insertion of the boring rod. In the present embodiment, the space part 35 is formed by inserting the boring rod and performing blow molding, as will be described later. As a result, the diameter of the barrel portion 33 is larger than the diameter of the barrel portion 23 of the preform 20, and the diameter of the space part 35 is larger than the diameter of the mouth portion 34.

Figure 4:
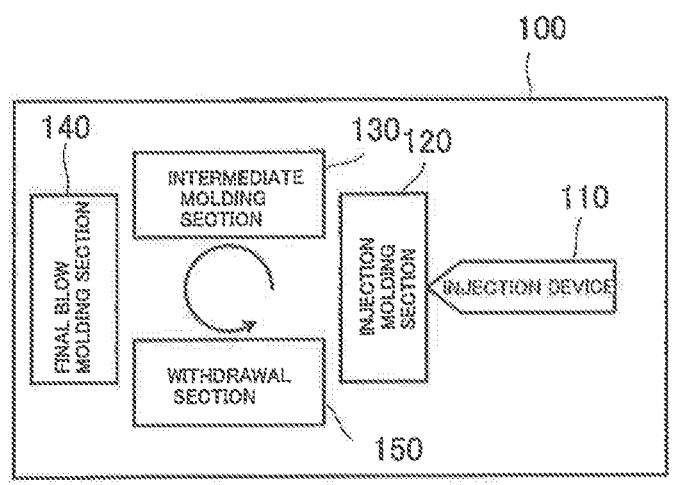
FIG. 4 is a block diagram showing the schematic configuration of a hollow container manufacturing apparatus according to an embodiment of the invention.

A hollow container manufacturing apparatus (molding apparatus) 100 according to the present embodiment has an injection molding section 120 connected to an injection device 110, an intermediate molding section 130, a final blow molding section 140, and a withdrawal section 150, for example, as shown in FIG. 4. That is, the hollow container manufacturing apparatus 100 has a 4-station structure, for example, as disclosed in Japanese Patent No. 3722671. As will be described in detail later, the first step is to form the preform 20 of a predetermined shape by injection molding in the injection molding section 120 (injection molding step). This preform 20 is transported to the intermediate molding section 130, where the intermediate molded product 30 is formed from the preform 20 (intermediate production formation step). The intermediate molded product 30 is transported to the final blow molding section 140, where the intermediate molded product 30 is blow-molded to form the hollow container 10 which is a final molded product (final blow molding step). Then, the hollow container 10 is transported to the withdrawal section 150, and withdrawn from the withdrawal section 150 to the outside of the manufacturing apparatus 100.

Figure 5:
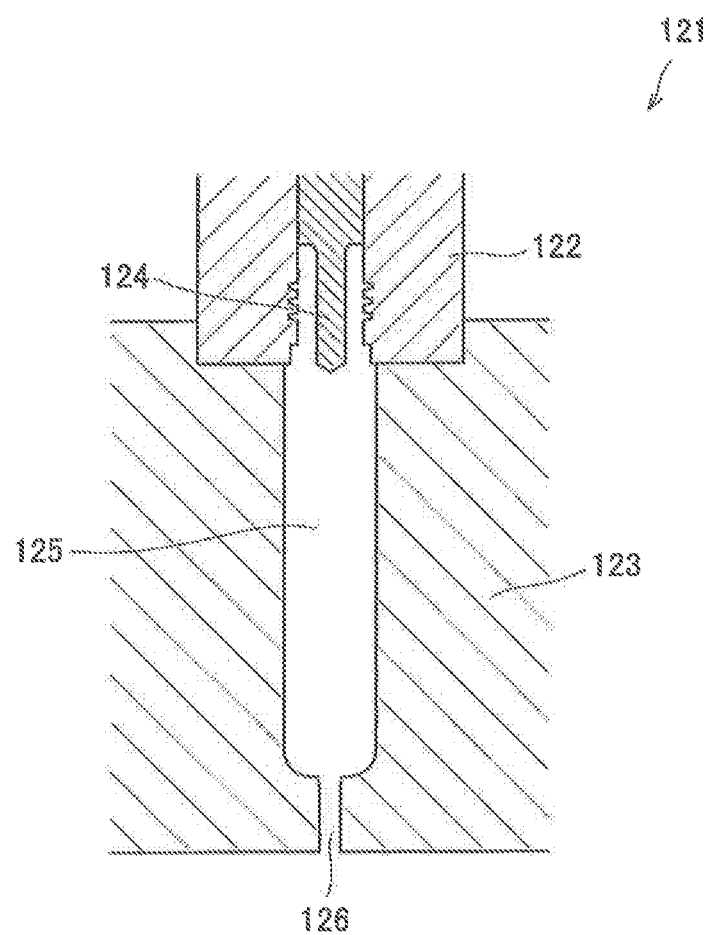
FIG. 5 is a schematic sectional view illustrating an injection step according to the embodiment.

Concretely, in the injection molding section 120, the preform 20 of the predetermined shape mentioned above is formed using an injection mold 121, as shown in FIG. 5. The injection mold 121 is composed of a neck mold 122 which defines the outer peripheral surface of the neck portion 22 of the preform 20 and comprises an openable and closable split mold; an injection cavity mold 123 defining the outer peripheral surface of the barrel portion 23; and an injection core mold 124 defining the inner peripheral surface of the preform 20, i.e., the inner peripheral surface of the neck portion 22 in the present embodiment. An injection space 125 is formed by the neck mold 122, the injection cavity mold 123, and the injection core mold 124.

A resin material (e.g., PET resin) as a raw material is charged into the injection space 125 via a gate 126 provided at the center of the bottom of the injection cavity mold 123, whereby the preform 20 as described above is formed.

The preform 20 according to the present embodiment has the barrel portion 23 formed to be solid. Even without cooling after injection molding, therefore, the preform 20 can be transported to the intermediate molding section 130, after the barrel portion 23 is released from the injection mold 121, with the neck portion 22 being held by the neck mold 122. That is, the preform 20 is ensured of having such strength that even without cooling after injection molding, the barrel portion 23 can be released from the injection mold 121 and carried to the intermediate molding section 130. In short, the barrel portion 23 of the preform 20 is formed to be solid at least partly so that the above strength of the preform 20 can be secured. In other words, the reference hole 24 of the preform 20 is formed with a sufficient depth to be capable of ensuring such a strength.

In the intermediate molding section 130, as shown in FIGS. 6A to 6C, the preform 20 is disposed within an intermediate blow mold 131 (FIG. 6A), where the intermediate molded product 30 is formed from the preform 20 (see FIG. 6B, FIG. 3B).

The intermediate blow mold 131 is equipped with a neck mold 132 for holding the neck portion 22 (32), an intermediate blow molding split mold 133, and a boring rod 134 to be inserted from the side of the neck portion 22 of the preform 20, that is, inserted via the reference hole 24 into the barrel portion 23. The boring rod 134 is provided to be upwardly and downwardly movable, and is configured to be capable of ejecting a gas, such as air, from its leading end. In the present embodiment, as indicated by a sectional view of FIG. 6C, the boring rod 134 is composed of a cylindrical first member 135, and a rod-shaped second member 136 inserted into the first member 135, and a ring-shaped flow path space (opening) 137 is formed between the first member 135 and the second member 136. From the leading end of the boring rod 134, air jets (eject, gushes) to the outside via the ring-shaped flow path space 137.

In the intermediate molding section 130 equipped with the above intermediate blow mold 131, the boring rod 134 is inserted from the side of the neck portion 22 of the preform 20 into the barrel portion to form the space part 35 of the predetermined depth within the barrel portion 23 to form the intermediate molded product 30, as shown in FIG. 6B. The barrel portion 23 is maintained at a relatively high temperature (it possesses ample residual heat derived from injection molding), and is not completely cured (hardened). Thus, the space part 35 can be formed satisfactorily by inserting the boring rod 134. When the boring rod 134 is inserted into the barrel portion 23 of the preform 20, moreover, air is jetted from the leading end of the boring rod 134. Hence, while the resin is being pushed away by this air, the space part 35 can be formed well.

In the present embodiment, moreover, the barrel portion 33 (23) is blow-molded by air jetting from the leading end of the boring rod 134. That is, the barrel portion 33 (23) is stretched in the lateral axis direction, and pressed against the intermediate blow molding split mold 133, by the high pressure air jetting from the boring rod 134. As a result, the diameter of the barrel portion 33 of the intermediate molded product 30 becomes larger than the diameter of the barrel portion 23 of the preform 20, and the diameter of the space part 35 becomes larger than the diameter of the mouth portion 34 (see FIG. 3B).

Figure 7A:
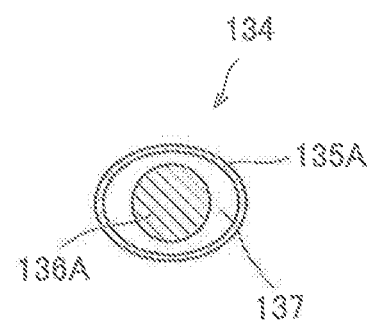
FIG. 7A is first sectional view showing modifications of a boring rod.

The boring rod 134 may be changed, as appropriate, so as to match the external appearance of the hollow container 10, which is the final molded product, and the inner surface shape of the space part 35 which is to be imparted. If the cross-sectional shape of the barrel of the hollow container 10 is elliptical, for example, the cross-sectional shape of the boring rod 134 may be nearly elliptical. Concretely, the boring rod 134 may be composed of a cylindrical first member 135A of a nearly elliptical cross-sectional shape, and a rod-shaped second member 136A of a nearly perfectly circular cross-sectional shape, for example, as shown in FIG. 7A.

Figure 7B:
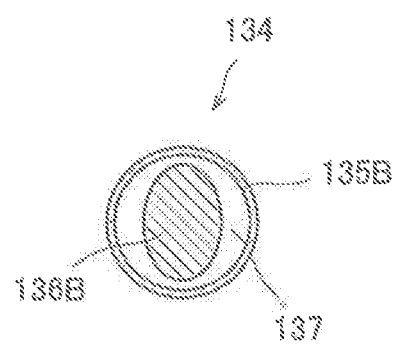
FIG. 7B is the second sectional view showing modifications of a boring rod.

Alternatively, as shown in FIG. 7B, for example, the boring rod 134 may be composed of a cylindrical first member 135B of a nearly perfectly circular cross-sectional shape, and a rod-shaped second member 136B inserted through the first member 135B and having chamfered side surfaces (having a nearly elliptical cross-sectional shape). In this configuration, the flow path in which air jets is defined in a predetermined direction. Even if the hollow container 10 is to be provided with a complicated external shape, such as an elliptical shape, therefore, it can be shaped appropriately. It is also permissible to configure the first member 135 and the second member 136 constituting the boring rod 134 so as to be drivable independently of each other, with a view to improving the degree of freedom of molding.

The manufacturing apparatus 100 according to the present embodiment is a so-called one-stage molding apparatus, in which the preform 20 injection-molded in the injection molding section 120 is transported to the intermediate molding section 130 while being maintained at a relatively high temperature. The barrel portion 23 of the preform 20, in particular, minimally lowers in temperature, because it is solid. In the present embodiment, moreover, the reference hole 24 is formed with a depth reaching the barrel portion 23 involving a minimal fall in temperature. In the intermediate molding section 130, therefore, the space part 35 can be formed satisfactorily by inserting the boring rod 134 into the barrel portion 23, without heating the preform 20.

In the intermediate molding section 130, needless to say, the preform 20 may be heated to a predetermined temperature (temperature-controlled), if necessary, before or during the placement of the preform 20 within the intermediate blow molding split mold 133.

If the manufacturing apparatus 100 is the 1-stage apparatus, it is desirable that the reference hole 24 be formed with such a relatively shallow depth as to reach the barrel portion 23. By so doing, the temperature fall of the barrel portion 23 during the transport of the preform 20 to the intermediate molding section 130 can be suppressed. If the manufacturing apparatus 100 is a so-called 2-stage molding apparatus, namely, if the injection-molded preform 20 is once cooled, on the other hand, it is preferred that the reference hole 24 be formed relatively deeply. By so doing, the preform 20 is easily reheated. The depth of the reference hole 24 is not particularly limited, and may be determined, as appropriate, in consideration of the deformation (strength), etc. of the preform 20 during mold release.

Figure 8:
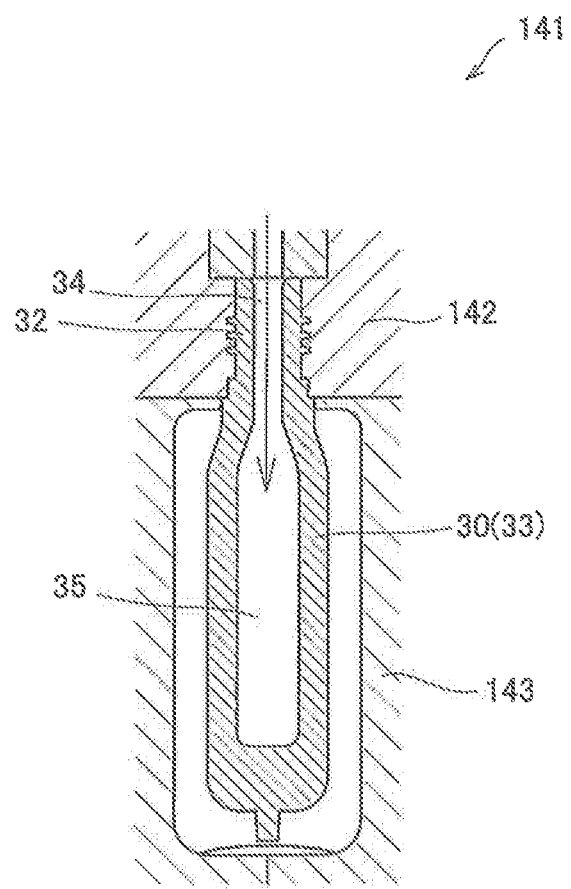
FIG. 8 is a schematic sectional view illustrating a final blow molding step in the embodiment.

Then, the intermediate molded product 30 is transported to the final blow molding section 140 and, as shown in FIG. 8, is disposed within a final blow mold 141 heated to a predetermined temperature. The final blow mold 141 is equipped with a neck mold 142 for holding the neck portion 32 of the intermediate molded product 30, and an openable/closable final blow molding split mold 143.

Within the final blow mold 141, the intermediate molded product 30 is blow-molded to obtain the hollow container 10 which is the final molded product (see FIG. 2). That is, high pressure air is introduced from the neck portion 32 (mouth portion 34) into the barrel portion 33 (space part 35) of the intermediate molded product 30 disposed within the final blow mold 141, whereby the barrel portion 33 is stretched and pressed against the final blow molding split mold 143. As a result, the hollow container 10, which is the final molded product of a desired shape, is molded (see FIGS. 1 and 2). In the final blow molding section 140, for the purpose of preventing positional displacement of the intermediate molded product 30 or stretching it positively in the vertical axis direction, for example, it is acceptable to adopt a mode in which a rod is inserted from the neck portion 32 into the space part 35 and, in this state, the intermediate molded product 30 is blow-molded to form the hollow container 10.

According to the hollow container manufacturing method concerned with the present embodiment, as described above, the preform 20 is formed so that the barrel portion 23 becomes substantially solid. Thus, with the neck portion 22 being held, but without cooling of the preform 20, the barrel portion 23 can be released from the injection mold 121, and transported to the intermediate molding section 130. Hence, there is no need to provide a cooling circuit or the like within the injection core mold 124 defining the inner surface of the preform 20 at the time of injection molding. Thus, the diameter of the injection core mold 124 can be decreased in comparison with the diameter of the conventional one. Since the diameter of the injection core mold 124 can be made small, the mouth 11 of the hollow container 10 can also be thinned extremely.

This means that the present invention enables the satisfactory molding of not only a hollow container with a relatively large mouth diameter, but also a narrow-mouthed hollow container with a very small mouth diameter.

In the present embodiment, the bottom 14 of the hollow container 10 is formed to have a larger wall thickness than that of the barrel 13. In molding the hollow container 10 of such a shape, the bottom portion of the preform 20 or the intermediate molded product 30 is also formed to have a larger wall thickness than that of the barrel portion. In the present invention, as stated above, the boring rod 134 is inserted into the barrel portion 23 of the preform 20 to form the space part 35. For this reason, the wall thickness of the bottom portion of the preform 20 can be adjusted relatively easily. Thus, even a hollow container having a bottom of a larger wall thickness than the wall thickness of a barrel can be formed with high precision.

According to the hollow container manufacturing method concerned with the present invention, as described above, the hollow container 10 can be formed with an attractive appearance, regardless of the shape of the hollow container 10, and can be used as a container for cosmetics, for example.

The present invention has been described above in connection with its embodiment, but it goes without saying that the invention is in no way limited to this embodiment. The present invention can be changed or modified appropriately without departing from its scope and spirit.

In the foregoing embodiment, for example, the reference hole of a depth reaching the barrel portion is formed in the preform, but the depth of this reference hole is not particularly limited. The reference hole is desirably provided even if shallow, for example, for positioning of the boring rod, but need not necessarily be provided.

In the above embodiment, for example, the intermediate molded product is formed from the preform, and the intermediate molded product is blow-molded to form the hollow container which is the final molded product. However, the molding procedure is not limited to this procedure. For example, it is permissible to inject-mold the preform, then inset the boring rod into the preform to form the space part, thereby converting the preform into the intermediate molded product, and then uninterruptedly blow-mold the intermediate molded product to form the hollow container which is the final molded product.

Figure 9:
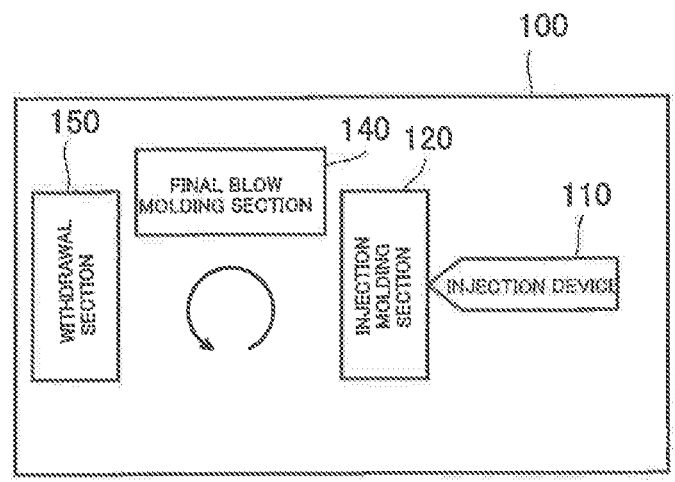
FIG. 9 is a block diagram showing another example of the hollow container manufacturing apparatus according to the embodiment.
Figures 10A, 10B:
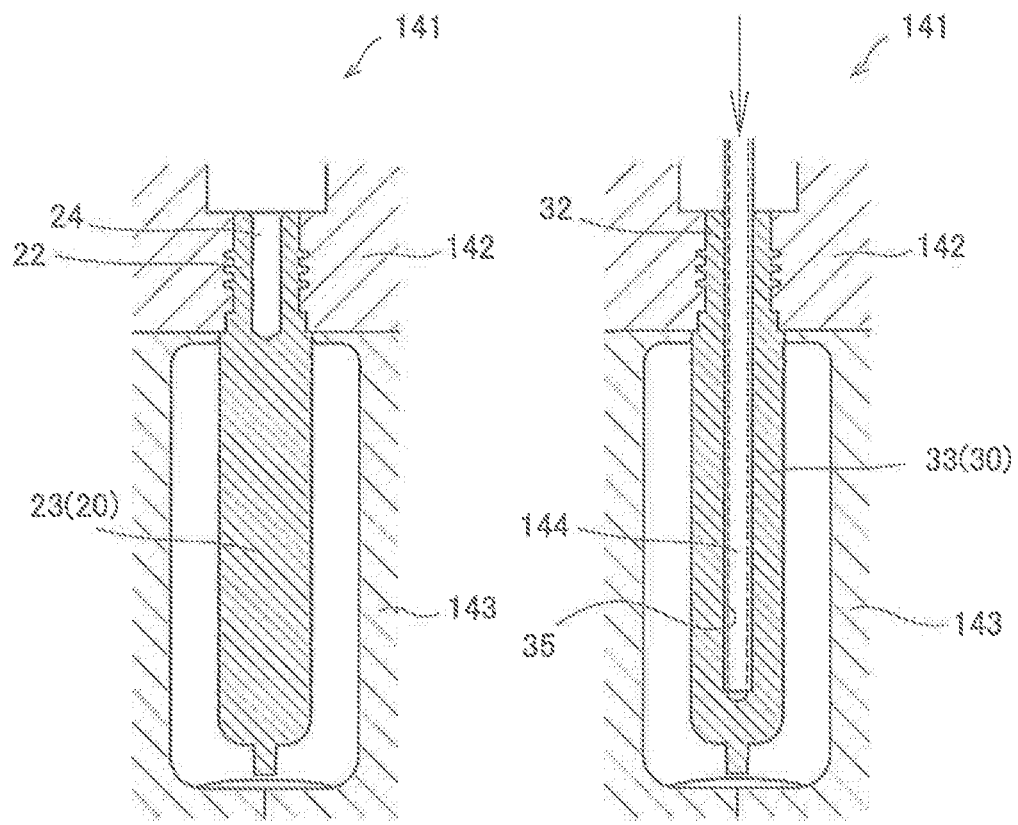
FIG. 10A is the first schematic sectional view illustrating another example of the final blow molding step according to the embodiment.
FIG. 10B is the second schematic sectional view illustrating another example of the final blow molding step according to the embodiment.

For example, the final blow molding section 140 of the hollow container manufacturing apparatus 100 may concurrently serve as the intermediate molding section. Concretely, the hollow container manufacturing apparatus 100 may be composed of the injection molding section 120, the final blow molding section 140 also serving as the intermediate molding section, and the withdrawal section 150, as shown in FIG. 9. That is, the manufacturing apparatus 100 may be of a 3-station structure as disclosed in JP-B-5-32211. In this case, the preform 20 injection-molded in the injection molding section 120 is disposed within the final blow mold 141 of the final blow molding section 140, as shown in FIG. 10A. Then, a boring rod 144, which the final blow mold 141 has, is inserted from the side of the neck portion 22 of the preform 20 into the barrel portion 23 to form the space part 35 of a predetermined depth and turn the preform 20 into the intermediate molded product 30, as shown in FIG. 10B. Uninterruptedly, the intermediate molded product 30 is blow-molded by air jetting (gushing) from the leading end of the boring rod 144. As a result, the hollow container 10 as the final molded product is obtained (see FIG. 2). The manufacturing apparatus 100 may also be configured such that the final blow molding section 140 further has the withdrawal section 150. That is, the manufacturing apparatus 100 may be of a 2-station structure as disclosed in Japanese Patent No. 2530398.

In the above-mentioned embodiment, the cylindrical hollow container 10 with the bottom having a larger wall thickness than that of the barrel is illustrated. However, the shape of the hollow container 10 is not particularly limited. For example, the bottom of the hollow container may have the same wall thickness as that of the barrel, and the hollow container need not be cylindrical.

EXPLANATIONS OF LETTERS OR NUMERALS

10 Hollow container
11 Mouth
12 Neck
13 Barrel
14 Bottom
20 Preform

21 Threaded groove
22 Neck portion
23 Barrel portion
24 Reference hole
30 Intermediate molded product
32 Neck portion
33 Barrel portion
34 Mouth portion
35 Space part
100 Manufacturing apparatus (molding apparatus)
110 Injection device
120 Injection molding section
121 Injection mold
122 Neck mold
123 Injection cavity mold
124 Injection core mold
125 Injection space
126 Gate
130 Intermediate molding section
131 Intermediate blow mold
132 Neck mold
133 Intermediate blow molding split mold
134 Boring rod
135 First member
136 Second member
137 Flow path space
140 Final blow molding section
141 Final blow mold
142 Neck mold
143 Final blow molding split mold
144 Boring rod
150 Withdrawal section

The invention claimed is:

1. A forming mold for use in forming a preform, which has a neck portion and a barrel portion, and whose barrel portion is filled with a molding material over an entire axial direction thereof, by injection molding; forming a space part in the barrel portion of the preform to convert the preform into an intermediate molded product; and blow-molding the intermediate molded product to form a hollow container which is a final molded product,
wherein the forming mold is equipped with a boring rod which is inserted from a side of the neck portion into the barrel portion of the preform to form the space part of at least a predetermined depth in the barrel portion,
wherein the boring rod includes a cylinder first member and a rod-shaped second member inserted into the first member, and
wherein the second member is longer than the first member.

2. The forming mold according to claim 1, wherein the boring rod is configured to be capable of jetting air from at least a leading end thereof into the barrel portion of the preform.

3. The forming mold according to claim 2, wherein the boring rod has at the leading end thereof a ring-shaped opening for jetting air.

4. An injection mold for use in forming a preform, which has a neck portion and a barrel portion, whose barrel portion is filled with a molding material over an entire axial direction thereof, and whose neck portion has a reference hole, by injection molding; inserting a boring rod from the reference hole to form a space part in the barrel portion of the preform, thereby converting the preform into an intermediate molded product; and blow-molding the intermediate molded product to form a hollow container which is a final molded product,
wherein the injection mold is equipped with a neck mold for defining an outer peripheral surface of the neck portion, and one injection core mold disposed inside the neck mold for defining an inner peripheral surface of the neck portion,
wherein the neck mold includes a pair of split molds which are openable and closable,
wherein the one injection core mold is disposed between the pair of split molds, and
wherein the one injection core mold includes:
a base part which is in contact with both of the pair of split molds; and
one protruding part which extends downward from the base part and is not in contact with the pair of split molds.

5. The injection mold according to claim 4, wherein the injection core mold is formed in a length sufficient to reach the barrel portion.

* * * * *